United States Patent
Pervillé et al.

(10) Patent No.: US 9,674,402 B2
(45) Date of Patent: Jun. 6, 2017

(54) METHOD FOR PRINTING AN OBJECT WITH IMAGES

(71) Applicant: OCE-TECHNOLOGIES B.V., Venlo (NL)

(72) Inventors: Jacques Pervillé, Fontenay sous Bois (FR); Cédric Valade, Villiers sur Marne (FR)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/200,171

(22) Filed: Jul. 1, 2016

(65) Prior Publication Data

US 2017/0006190 A1  Jan. 5, 2017

(30) Foreign Application Priority Data

Jul. 3, 2015  (EP) .................... 15175288

(51) Int. Cl.
| | |
|---|---|
| H04N 1/60 | (2006.01) |
| B41J 2/21 | (2006.01) |
| B41J 3/407 | (2006.01) |
| B41J 11/00 | (2006.01) |
| B41M 3/00 | (2006.01) |

(52) U.S. Cl.
CPC .......... H04N 1/6002 (2013.01); B41J 2/2117 (2013.01); B41J 3/4073 (2013.01); B41J 11/0015 (2013.01); H04N 1/6097 (2013.01); B41M 3/008 (2013.01)

(58) Field of Classification Search
CPC ... H04N 1/6002; H04N 1/6097; B41J 2/2117; B41J 3/4073; B41J 11/0015; B41M 3/008; B29C 67/0051; B29C 67/0055; B29C 67/0059; B33Y 10/00; B33Y 30/00; B33Y 50/00; B33Y 50/02
USPC ....................................... 347/110
See application file for complete search history.

(56) References Cited

U.S. PATENT DOCUMENTS

| | | | | |
|---|---|---|---|---|
| 5,276,478 A | * | 1/1994 | Morton | .......... G02B 3/005 348/E13.029 |
| 5,812,152 A | * | 9/1998 | Torigoe | .......... B41J 2/01 347/2 |
| 2004/0069182 A1 | * | 4/2004 | Nakajima | .......... C09D 11/36 106/31.13 |

(Continued)

*Primary Examiner* — Huan Tran
*Assistant Examiner* — Alexander D Shenderov
(74) *Attorney, Agent, or Firm* — Birch, Stewart, Kolasch & Birch, LLP

(57) ABSTRACT

A method for printing an object using a color image printer is provided. The printer applies colorant dots having a flat shape. The object has an apparent surface with a locally varying color for representing a color image on the surface. The printer comprises a white colorant, that is applied as a background underneath a surface colorant for begetting a local color of the apparent surface. The invented method comprises the steps of: generating two-dimensional image data for composing the object in slices; determining a local surface orientation of the apparent surface of the object; and applying colorant material in accordance with the two-dimensional image data, wherein, in dependence on the local surface orientation, white colorant dots are deposited between other colorant dots to compensate a color effect of an orientation of a surface colorant dot relative to the local surface orientation.

6 Claims, 2 Drawing Sheets

(56) References Cited

U.S. PATENT DOCUMENTS

2012/0076999 A1  3/2012  Nakano et al.
2012/0237667 A1  9/2012  Koyama et al.
2012/0287183 A1  11/2012  Bitoh
2014/0085364 A1* 3/2014  Otake .................... B41J 2/2132
                                                347/9

* cited by examiner

METHOD FOR PRINTING AN OBJECT WITH IMAGES

BACKGROUND OF THE INVENTION

1. Field of the Invention

The present invention relates to a method for printing an object using a digital color image printer. The invention further relates to a print system configured to apply a method for printing an object.

2. Description of the Related Art

Various forms of printing objects are known. Objects relate to three-dimensional bodies in a physical world. Printing objects relates to a layerwise application of material in a similar way as images are printed, thereby composing an object. Most often, printing is in the form of jetting material from a nozzle or from an array of nozzles, but other forms, such as the application of two-dimensional toner layers or color printed paper layers have also been described. Printing may be performed on a substantially flat surface or on a nucleus, or base object, that is manipulated to have material applied from different sides. All these forms of printing and more are comprised in what is known as 3D-printing, or additive manufacturing.

Digital color image printing comprises various processes that convert a digital, electronic image into a reproduction of the image on a receiving material, an image being two-dimensional by definition. In the reproduction, colorants are used to locally generate an optical density in accordance with the electronic image. In some processes, these colorants are applied on top of the receiving material, thereby locally thickening the reproduction. Such processes comprise the application of toner material, UV-curable ink and phase change materials. In other processes, the colorants are absorbed into the receiving material, such as by application of solvent and water based colorants. The processes that locally thicken the material may be used to create stacks of colorant material by applying the colorants in slices on top of each other. Applied in this way, these processes look like three-dimensional processes and may be deployed for printing objects. Nevertheless, the colorants are commonly applied as dots, having a flat, mostly circular shape in order to have a large surface. In some processes, ink drops of 10 pl are applied, resulting in 60 μm dots, having a height of about 3.5 μm. The specific dot shape depends on the ink properties, such as its viscosity, the application temperature and the receiving material, but generally, the dots have a flat shape and quite a number of slices have to be applied to obtain a predetermined height. It is also noted, that in some processes, the colorant material is limited to a predetermined thickness, since a further processing step is needed to obtain a stable state of the applied material. For example, in the process of applying UV-curable ink, a further processing step of curing an applied ink dot by UV-radiation (ultraviolet light) is needed to solidify the liquid material. Thus, a limit exists for the amount of material in the applied dots.

A special kind of object that has been printed with a two-dimensional color image printer, is a relief image. For this object, a height channel is added to the customary color image channels. This enables an image printer to derive a number of slices of colorants to be put on top of each other for each print position, thereby creating an image having palpable height differences. In these prints, a reproduced color of a pixel is made independent of the height of the pixel by adding a uniformly colored, preferably white, ink layer on top of a relief structure as defined by the height information. The colorants for generating a color of a pixel are printed as a skin layer on top of the uniformly colored ink layer in accordance with the color channels of the image. Thus, the colorants are employed in a way they are composed for, since their color properties are optimal when applied on a white background. Another process for making a relief image comprises the use of transparent ink that is printed in accordance with the height information on top of a reproduction of the image on the receiving material, that is usually white. These relief images are objects for viewing from a main direction, similarly to viewing usual images on (locally) flat material.

In contrast, an arbitrary object may be viewed from multiple sides. Therefore, the information for printing an object comprises a definition of the shape of the object and its appearance from several sides, including images on apparent sides. The slicewise material application is derived from this information in the form of image slices that are applied in sequence. Following a similar approach as indicated above, the colorants that determine the appearance of the object are applied as a skin layer onto a white ink buffer layer in order to optimally use the color properties of the colorants. The underlying shape of the object is composed of an arbitrary composition of colorants, since their color is not visible and their application is aimed at begetting a material volume.

Still, it is one thing to derive image slices from an object definition, comprising an image on multiple sides of the object. It is another to obtain a printed object as defined. Without major modification of the colorant materials as applied in digital color printing, it has been found that a problem occurs in obtaining a comparable gamut for colors on all sides of the object. It is an object of the present invention to obtain a similar range of colors for all sides of a layerwise printed object, independent of the direction wherein the image slices are applied.

SUMMARY OF THE INVENTION

According to the present invention, a method for printing an object is provided using a color image printer that applies colorant dots having a flat shape, the object having an apparent surface with a locally varying color for representing a color image on the surface, the printer comprising a white colorant, that is applied as a background underneath a surface colorant for begetting a local color of the apparent surface, the method comprising the steps of: generating two-dimensional image data for composing the object in slices; determining a local surface orientation of the apparent surface of the object; and applying colorant material in accordance with the two-dimensional image data, wherein the composition of the colorant material is dependent on an angle between the colorant dots and the local surface orientation.

Since the colorant dots have a flat shape that is oriented parallel to a slice applied by the two-dimensional color image printer, dots on an apparent surface parallel to these slices reflect incoming light from another direction than dots on an apparent surface perpendicular to these slices. More specifically, the light reflected by the colorant dots on a parallel apparent surface travels a short path through the colorant layer before reaching the white background layer, whereas the light reflected by colorant dots on a perpendicular apparent surface travels a long path through the dots before reaching the white background layer. This results in a different perceived color for differently oriented dots relative to the apparent surface. In particular, the colors on the perpendicular surfaces tend to be very dark. This effect is compensated by depositing other, usually lighter, colorant dots in-between the colorant dots, affecting the path of light through the colorant dots.

In an embodiment, white colorant dots are deposited between other colorant dots to compensate a color effect of an orientation of a surface colorant dot relative to the local surface orientation. White colorant effectively reflects all light wavelengths, thus making the path of light through the colorant dot shorter.

In a further embodiment, the printer applies UV-curable colorants which are cured during the step of applying colorant material. UV-curable colorants are cured by UV-radiation (ultraviolet light) which causes a transition from a liquid state to a solid one. The applied dots are usually not very thick in order to have the UV-light completely cure the material. The color effect is prominent for these dots, since their shape is usually rather flat.

In a further embodiment, the printer comprises colorless, transparent ink, which is mixed with other colorants for enhancing a color of the surface colorant dots. Instead of reflecting the incoming light, as the intermediate white colorant dots do, the light is passed through the transparent ink to a next colorant dot or to the surface of a skin colorant layer, wherein the colorant dot resides, thus further affecting the perceived color of an apparent surface in dependence on an orientation of the local surface relative to the orientation of the colorant dot, which is parallel to the printed slices.

Further details of the invention are given in the dependent claims. The present invention may also be embodied in a print system, configured to apply colorant material in slices in order to print an object having an apparent surface with a locally varying color for representing a color image on the surface, the print system applying a white colorant as a background underneath a surface colorant for begetting a local color of the apparent surface and configured to apply a method comprising the steps of: generating two-dimensional image data for composing the object in slices; determining a local surface orientation of the apparent surface of the object; and applying colorant material in accordance with the two-dimensional image data, wherein, in dependence on the local surface orientation, white colorant dots are deposited between other colorant dots to compensate a color effect of an orientation of a surface colorant dot relative to the local surface orientation.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF EMBODIMENTS

Figure 1:
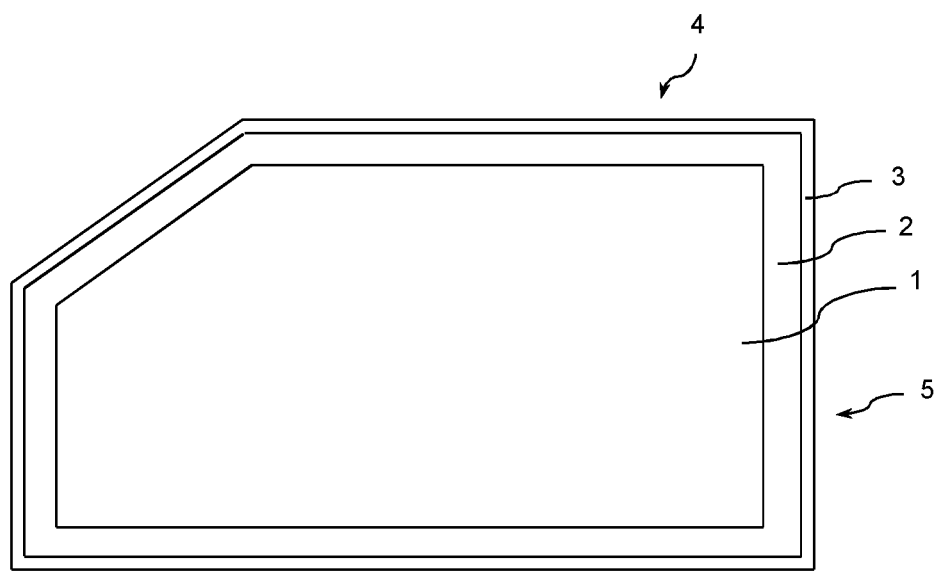
FIG. 1 shows a cross section of an object having images on various sides.

The present invention will now be described with reference to the accompanying drawings, wherein the same or similar elements are identified with the same reference numeral. Embodiments of the invention have been worked out on a printer applying UV-curable, colored ink on a substrate that is positioned on a horizontal flatbed underneath a print head that is movable across the flatbed in two directions. The distance between the print head and the surface of the flatbed is adjustable. One of the ink colors is white. The ink is a liquid with low viscosity at room temperature, which is advantageous for applying drops having a volume of 5 to 25 pl. Upon touching a solid surface, the drops transform into disc shaped fluid elements having a diameter of about 50 to 70 µm and a height of about 2 to 10 µm. Ultra-violet (UV) radiation converts the element to a solid form. However, other printers, such as printers applying a phase change material that is applied at an elevated temperature and solidifies upon cooling, are also capable of embodying the invention. These printers are usually applied for making hardcopy reproductions of an electronic image on a flat substrate, but as long as a printer applies material, in particular colored material, in slices that can be stacked upon each other, thus composing an object having different apparent surfaces, the invention is applicable. Printers having this ability are widely commercially available.

FIG. 1 shows a cross section of an object as it is to be printed. The object comprises an inner part 1, an isolation part 2 and a skin part 3. The color properties of material that is used to obtain the inner part 1 are immaterial. These properties are shielded by the material of isolation part 2, which is preferably composed of white ink. This gives a background to the color that is obtained by the colorant ink in the skin part 3. Two different apparent surfaces have been indicated by 4 and 5. Each apparent surface may show an image by selective application of colorants from the cyan, magenta, yellow and black ink comprised in the conventional ink set of a printer. Of course, other sets of colorants that may be used to make a hardcopy of an image, could be applied as well.

Figure 2:
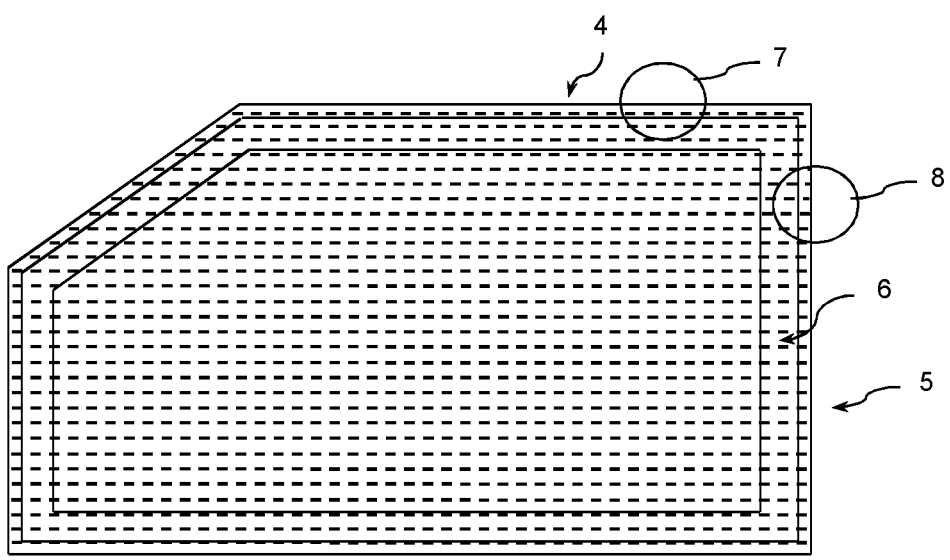
FIG. 2 shows a series of slices for printing the object of FIG. 1.

FIG. 2 shows the same cross section of the object as shown in FIG. 1 with a number of slices 6 drawn in the object. An object may electronically be represented either as a wire frame model or as a voxel structure, each defining a shape and appearance of the object in a specific way. These different representations may be readily converted into a set of voxels, wherein only the outer voxels are defined in terms of a color, thereby representing an image on a surface of the object.

The set of voxels may be used to derive a slice of applicable colorants, the slice associated with a height that has already been obtained by stacking previous slices. A slice is a two-dimensional set of colorant amounts that are applied in a single swipe of the print head array across the flat bed surface. A slice is equivalent to an image being applied on a flat substrate when the printer is used as a customary image printer. The slice may thus be considered as an equivalent of image data. Depending on a print strategy, a single swipe may comprise several print head passes to apply the object elements of the slice, that are defined by their ink composition, which corresponds to a number of ink drops of each ink. Regions 7 and 8 located on the apparent surfaces 4 and 5, respectively, each of the apparent surfaces having a different orientation relative to stack of slices 6.

Figures 3A, 3B:
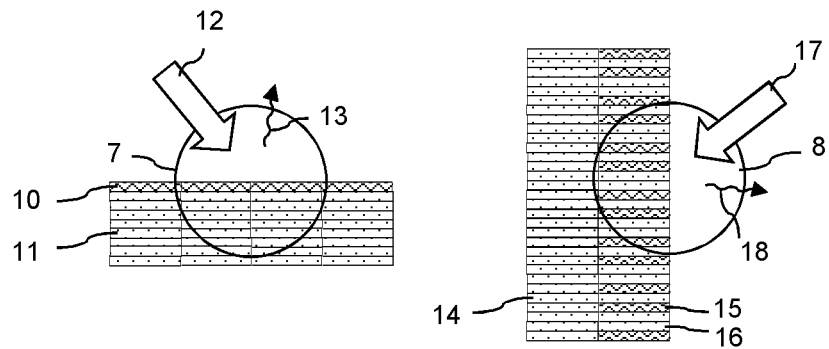
FIG. 3A shows an apparent surface in a parallel orientation relative to the slices.
FIG. 3B shows an apparent surface perpendicular to the slices.

FIG. 3A and FIG. 3B illustrate how the orientation of an apparent surface relative to the slices affects the color properties of the surface. In FIG. 3A, region 7 is shown for a surface parallel to the colored object elements 10 in the skin part and the white object elements 11 in the isolation part. Incoming light 12 is partly reflected from the surface and partly penetrates the surface, although only up to a limited depth. The resulting outcoming light 13 is thus filtered by the colorant on the surface of the object and represents a local color of the object.

In FIG. 3B, region 8 is shown for a surface perpendicular to the colored object elements 15, which are blended, or alternated, with white object elements 16. Both elements are in the skin part of the object. A number of object elements 14 of the isolation part are also shown. In this case, incoming light 17 is partly reflected from the surface with both kind of object elements 15 and 16 and partly penetrates the surface. However, since the isolation part is so much deeper as a result of the shape of the object elements, the resulting color of the outcoming light 18 is differently affected by the object elements in the skin part. In order to obtain a similar gamut of colors, the colored object elements 15 have been blended with white elements 16. In general, the local color of an object is made with an ink composition that is different for a composition that is applicable for an apparent surface having a different orientation, due to this color effect due the shape of the object elements.

Figure 4:
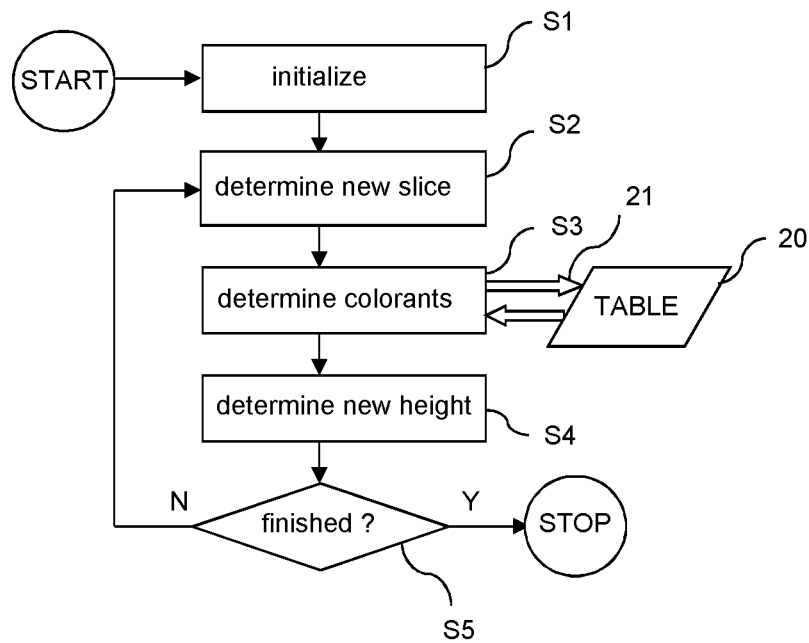
FIG. 4 is a flow diagram of an embodiment of the invention.

In FIG. 4, a stepwise workflow of an embodiment of the printing method is shown. The process starts with an initialization step S1, wherein a voxel object is received and a processed height is set to zero. This is the height of the substrate on which the object is printed. A height value is maintained for each print position on the substrate, since the obtained height is not necessarily uniform over the surface of the substrate. The voxel object is coming from a mesh representation of the object or any other representation that is suitable for describing the object electronically. Voxels are either inner voxels, if they belong to the inner part 1, isolation voxels, belonging to the isolation part 2, or skin voxels in skin part 3. These last voxels are further specified by a color in either a device dependent color space, such as RGB, having a Red, a Green and a Blue color channel, or a device independent color space, such as CIELab. The color may be specified in a number of steps from minimum to maximum. For example, each color channel may use 6 steps, thereby having 216 color channel combinations for a voxel. Furthermore, it is convenient to concatenate a number of voxels in a direction perpendicular to the substrate into sticks that have a skin pixel on both ends. This reduces the amount of memory that is needed for storing a number of voxels.

A further property of a skin voxel that is needed in the further processing, is the orientation of the surface the skin voxel is part of. This information may already be derived during the voxelization of the object, but may also be generated from the position of the skin voxels directly surrounding a particular skin voxel. The orientation of interest is the angle of inclination of the surface with the direction perpendicular to the substrate. In particular, a horizontal orientation, wherein the skin voxel is part of a surface that is parallel to the substrate, and a vertical orientation, wherein the skin voxel is part of a surface that is perpendicular to the substrate, are to be discerned. Intermediate orientations may also be used.

From the set of voxels, a slice of pixels is derived corresponding to the obtained height in step S2. The obtained height is determined from earlier processed slices. Pixels corresponding to inner voxels are marked as inner pixels and pixels corresponding to isolation voxels are isolation pixels. A determination of colorant composition for these types of pixels in step S3 is straightforward. For inner pixels, the color of the colorants is arbitrary and for isolation pixels, a light colorant, preferably white, is used. The amount of colorant to be applied is only dependent on the already acquired height and the height to be obtained after processing the present slice. For skin pixels, which have the same color as the skin voxel the slice passes through, the colorant composition is determined in dependence on the orientation of the apparent surface of the skin voxel. This orientation can not be determined from the pixels in the slice and has therefore be passed as a property of a skin voxel. A number of tables 20 are used to convert a color and orientation of a skin pixel in a colorant composition. Common colorant combinations comprise cyan, magenta, yellow, and black (CMYK), combined with white colorant and possibly transparent, colorless colorant. The size of the table depends on the number of colors that are used and the number of orientations that are discerned. In case 216 colors are used and two orientations, 432 recipes of colorant combinations are listed in the table. A skin pixel conveys its properties to the table and receives a colorant recipe. Besides the amount of colorant, a height that is obtained after application of the colorants is listed, which is especially important for vertical surfaces, since these skin pixels have further skin pixels on top of them. In the recipes for horizontal skin pixels, white colorant will hardly be applied, but in the recipes for vertical skin pixels, white colorant is needed to compensate the lateral dimension of the applied colorant. Of course, the resulting color of the colorant recipe is obtained by calibration and conventional color matching procedures. It is also noted, that if the various colorants are applied before curing, the colorants will mix and a composite dot will result, whereas if a curing step is applied between the application of various colorants, separate colorant dots will be stacked upon each other. Both alternatives are part of the colorant recipe that is given in the tables 20. In a last step, S4, a height is determined for each print position in order to enable a determination of further slices. If the object is not yet finished (S5, N), a further slice is processed, otherwise, the process stops (S5, Y).

It is possible to apply the colorants of a slice immediately after it is determined. It may be printed using a print strategy in a similar way as an image is printed. For example, an eight pass print strategy may be applied with partly overlapping print swaths to obtain a uniform distribution of colorants. Although a height for each print position is calculated, as determined from a calibration, the print process may alternatively be equipped with a height sensor to more accurately determine an acquired height. On the other hand, an object may be completely be divided in slices which are applied successively without further calculation.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A method for printing an object using a color image printer that applies colorant dots having a flat shape, the object having an apparent surface with a locally varying color for representing a color image on the surface, the printer comprising a white colorant, that is applied as a background underneath a surface colorant for begetting a local color of the apparent surface, the method comprising the steps of:
   a) generating two-dimensional image data for composing the object in slices;
   b) determining a local surface orientation of the apparent surface of the object;
   c) applying colorant material in accordance with the two-dimensional image data,
   wherein the composition of the colorant material is dependent on an angle between the colorant dots and the local surface orientation,
   wherein white colorant dots are deposited between other colorant dots to compensate a color effect of an orientation of a surface colorant dot relative to the local surface orientation, and
   wherein a number of white colorant dots between other colorant dots is augmented if an angle between the local surface orientation and a direction perpendicular to the applied slices increases.

2. The method according to claim 1, wherein the printer applies UV-curable colorants which are cured during the step of applying colorant material.

3. The method according to claim 1, wherein the printer further comprises colorless, transparent ink which is mixed with other colorant dots for enhancing a color of the surface colorant dots.

4. A print system configured to apply colorant material in slices in order to print an object having an apparent surface with a locally varying color for representing a color image on the surface, the print system applying a white colorant as a background underneath a surface colorant for begetting a local color of the apparent surface and configured to apply a method according to claim 1.

5. The print system according to claim 4, wherein a color management module applies a color profile for converting an image color into a printer dependent colorant composition, the color profile being dependent on an angle between the colorant dots and a local surface orientation of the apparent surface the image color is printed on.

6. A print system configured to apply colorant material in slices in order to print an object having an apparent surface with a locally varying color for representing a color image on the surface, wherein the print system comprises a color image printer configured to apply colorant dots having a flat shape and to:
   apply a white colorant as a background underneath a surface colorant for begetting a local color of the apparent surface,
   generate two-dimensional image data for composing the object in slices;
   determine a local surface orientation of the apparent surface of the object; and
   apply colorant material in accordance with the two-dimensional image data,
   wherein the composition of the colorant material is dependent on an angle between the colorant dots and the local surface orientation, and
   wherein a color management module applies a color profile for converting an image color into a printer dependent colorant composition, the color profile being dependent on an angle between the colorant dots and a local surface orientation of the apparent surface the image color is printed on.

* * * * *